(12) United States Patent
Gurbuz (10) Patent No.: US 9,544,615 B2
(45) Date of Patent: Jan. 10, 2017

(54) METHOD AND SYSTEM FOR PROCESSING VIDEO CONTENT

(71) Applicant: SONY CORPORATION, Tokyo (JP)

(72) Inventor: Sabri Gurbuz, Campbell, CA (US)

(73) Assignee: SONY CORPORATION, Tokyo (JP)

( * ) Notice: Subject to any disclaimer, the term of this patent is extended or adjusted under 35 U.S.C. 154(b) by 238 days.

(21) Appl. No.: 14/542,211

(22) Filed: Nov. 14, 2014

(65) Prior Publication Data
US 2016/0142730 A1    May 19, 2016

(51) Int. Cl.
| | | |
|---|---|---|
| *H04N 11/02* | (2006.01) | |
| *H04N 19/527* | (2014.01) | |
| *H04N 19/87* | (2014.01) | |
| *H04N 19/139* | (2014.01) | |
| *H04N 19/142* | (2014.01) | |
| *H04N 19/172* | (2014.01) | |
| *H04N 19/105* | (2014.01) | |
| *G06K 9/00* | (2006.01) | |
| *G06T 7/20* | (2006.01) | |
| *H04N 5/14* | (2006.01) | |
| *G11B 27/28* | (2006.01) | |

(Continued)

(52) U.S. Cl.
CPC ........ *H04N 19/527* (2014.11); *G06K 9/00751* (2013.01); *G06T 7/00* (2013.01); *G06T 7/20* (2013.01); *G06T 7/408* (2013.01); *G11B 27/28* (2013.01); *H04N 5/147* (2013.01); *H04N 19/105* (2014.11); *H04N 19/139* (2014.11); *H04N 19/142* (2014.11); *H04N 19/172* (2014.11); *H04N 19/87* (2014.11); *G06K 9/4652* (2013.01); *G06K 9/52* (2013.01); *G06T 2207/10016* (2013.01)

(58) Field of Classification Search
USPC .......................... 375/240.01–240.29
See application file for complete search history.

(56) References Cited

U.S. PATENT DOCUMENTS

| | | | |
|---|---|---|---|
| 6,977,963 B1 * | 12/2005 | Shiiyama | .......... G06F 17/30802 348/700 |
| 7,164,717 B2 | 1/2007 | Katsavounidis et al. | |

(Continued)

FOREIGN PATENT DOCUMENTS

WO            0237859 A2       5/2002

OTHER PUBLICATIONS

European Extended Search Report received for European Patent Application No. 15194373.5, mailed on Apr. 29, 2016, p. 7.
K. Tse, et al. "A Scene Detection Algorithm for MPEG Compressed Video Sequences", University of Ottawa. Ontario, Canada, 1995 IEEE, vol. 2, Sep. 1995, pp. 827-830.

(Continued)

*Primary Examiner* — Leron Beck
(74) *Attorney, Agent, or Firm* — Chip Law Group (57) ABSTRACT

Various aspects of a method and system to process video content are disclosed herein. The method includes determination of a first frame identification value associated with a video content. The first frame identification value corresponds to an average color value of a frame of the video content. The method further includes determination of a second frame identification value associated with the video content. The second frame identification value corresponds to a global motion vector (GMV) value of the frame of the video content. The method further includes determination of a first intermediate frame based on one or both of the first frame identification value and the second frame identification value.

24 Claims, 7 Drawing Sheets

(51) Int. Cl.
*G06T 7/00* (2006.01)
*G06T 7/40* (2006.01)
*G06K 9/46* (2006.01)
*G06K 9/52* (2006.01)

(56) References Cited

U.S. PATENT DOCUMENTS

| | | | | |
|---|---|---|---|---|
| 7,212,230 B2* | 5/2007 | Stavely | H04N 5/23248 | 348/208.1 |
| 7,447,337 B2* | 11/2008 | Zhang | G06K 9/00711 | 348/699 |
| 7,463,789 B2* | 12/2008 | Myochin | G06T 11/60 | 345/555 |
| 8,406,608 B2* | 3/2013 | Dubin | H04N 7/147 | 386/278 |
| 8,428,125 B2 | 4/2013 | Oguz | | |
| 2007/0195884 A1* | 8/2007 | Sakamoto | H04N 19/573 | 375/240.16 |
| 2008/0193099 A1* | 8/2008 | Nakai | G11B 27/034 | 386/281 |

OTHER PUBLICATIONS

Junyong You et al., "A Multiple Visual Models Based Perceptive Analysis Framework for Multilevel Video Summarization", IEEE Transactions on Circuits and Systems for Video Technology, vol. 17, No. 3, Mar. 2007, pp. 273-285.

Georgeo Rascioni, et al. "An Optimized Dynamic Scene Change Detection Algorithm for H.264/AVC Encoded Video Sequences" Hindawi Publishing Corporation, International Journal of Digital Multimedia Broadcasting, vol. 2010, Article ID864123, 9 Pages. Dec. 28, 2009.

Jung-Rim Kim, et al. "Fast Scene Change Detection for Personal Video Recorder". IEEE, pp. 683-688, vol. 49, Nos. 3 , Aug. 2003.

Patrick Bouthemy, et al. "Unified Approach to Shot Change Detection and Camera Motion Characterization", IEEE Transactions on Circuits and Systems for Video Technology, vol. 9, Issue 7, Published on Oct. 1, 1999, pp. 1030-1044, "http://ieeexplore.ieee.org/xpl/login.jsp?reload=true&tp=&arnumber=795057&url=http%3A%2F%2Fieeexplore.ieee.org%2Fxpls%2Fabs_all.jsp%3Farnumber%3D795057".

* cited by examiner

| frame ID 402 | YUVG frame ID 404 | GMV frame ID 406 |
|---|---|---|
| 6 | 1752 | 7 |
| 352 | 2264 | 7 |
| 360 | 3752 | 20 |
| 450 | 2752 | 7 |
| 472 | 1752 | 7 |
| 544 | 1752 | 20 |
| 558 | 4752 | 207 |
| ⋮ | ⋮ | ⋮ |

METHOD AND SYSTEM FOR PROCESSING VIDEO CONTENT

FIELD

Various embodiments of the disclosure relate to processing video content. More specifically, various embodiments of the disclosure relate to processing video content to generate a video digest.

BACKGROUND

Recent advancements in the field of video processing have introduced various methods to generate a video digest from a motion video. A video digest is a combination of one or more video highlights. A video highlight may be determined based on a selection of one or more frames from one or more video segments in the motion video. The one or more video segments may be determined whenever a scene change is detected in the motion video.

In certain scenarios, the one or more video highlights may be manually selected by the user based on one or more parameters, such as preferred timestamps and/or preferred duration. Such a manual selection may not take into consideration video frame information and/or camera motion information which is undesirable.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and a system to process video content are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various implementations may be found in a method and/or system to process video content. Exemplary aspects of the disclosure may comprise a method to generate a video digest. The method may comprise determination of a first frame identification value associated with video content. The first frame identification value may correspond to an average color value of a frame of the video content. The method may further comprise determination of a second frame identification value associated with the video content. The second frame identification value may correspond to a global motion vector (GMV) value of a frame of the video content. The method may further determine a first intermediate frame. The first intermediate frame may be based on one or both of the first frame identification value and the second frame identification value. The first intermediate frame may indicate a scene change in the video content.

In an embodiment, the first frame identification value may correspond to a gradient value associated with the frame of the video content. In an embodiment, the average color value may correspond to a color model comprising one of: a luminance and chrominance (YUV) color model and/or a red, green, and blue (RGB) color model. In an embodiment, the first frame identification value for the frame may be generated based on a first quantization value. In an embodiment, the second frame identification value may be based on a second quantization value.

In an embodiment, a second intermediate frame may be determined based on one or both of: another first frame identification value and another second frame identification value. In an embodiment, the second intermediate frame may indicate a scene change in the video content. In an embodiment, one or more frames may be determined between the first intermediate frame and the second intermediate frame. In an embodiment, the one or more frames may be determined based on a change in one or both of: the first frame identification value, the second frame identification value. In an embodiment, each of the first intermediate frame and the second intermediate frame may have an associated first frame identification value, a second frame identification value. In an embodiment, a video segment may be generated based on the determined one or more frames and the first intermediate frame. In an embodiment, one or more key frames may be selected from the generated video segment. The one or more of determined key frames may be selected based on one or more parameters and/or one or more user preferences associated with each of the frames.

In an embodiment, the parameter may comprise one or more of a motion behavior analysis value and/or a stability rank. In an embodiment, the generated one or more video segments may be combined to generate a video digest based on a user preference and/or a default setting. In an embodiment, the user preference may comprise one or more of a desired duration of the video segment, a desired duration of the video digest, a duration of an audio file provided by the user, a desired stability rank, an object present in a video segment, a characteristic associated with the object, and/or a color value and a gradient value associated with the key frames corresponding to a video segment In an embodiment, the desired duration of the video digest may be determined based on one or more of, a user input comprising an audio file, and/or a pre-stored value of video digest duration. In an embodiment, a stability rank that corresponds to a frame of the video content may be determined. In an embodiment, the stability rank may correspond to a variance in GMV characteristics of the frame. In an embodiment, the determined stability rank may be inversely proportional to the variance in GMV characteristics.

Figure 1:
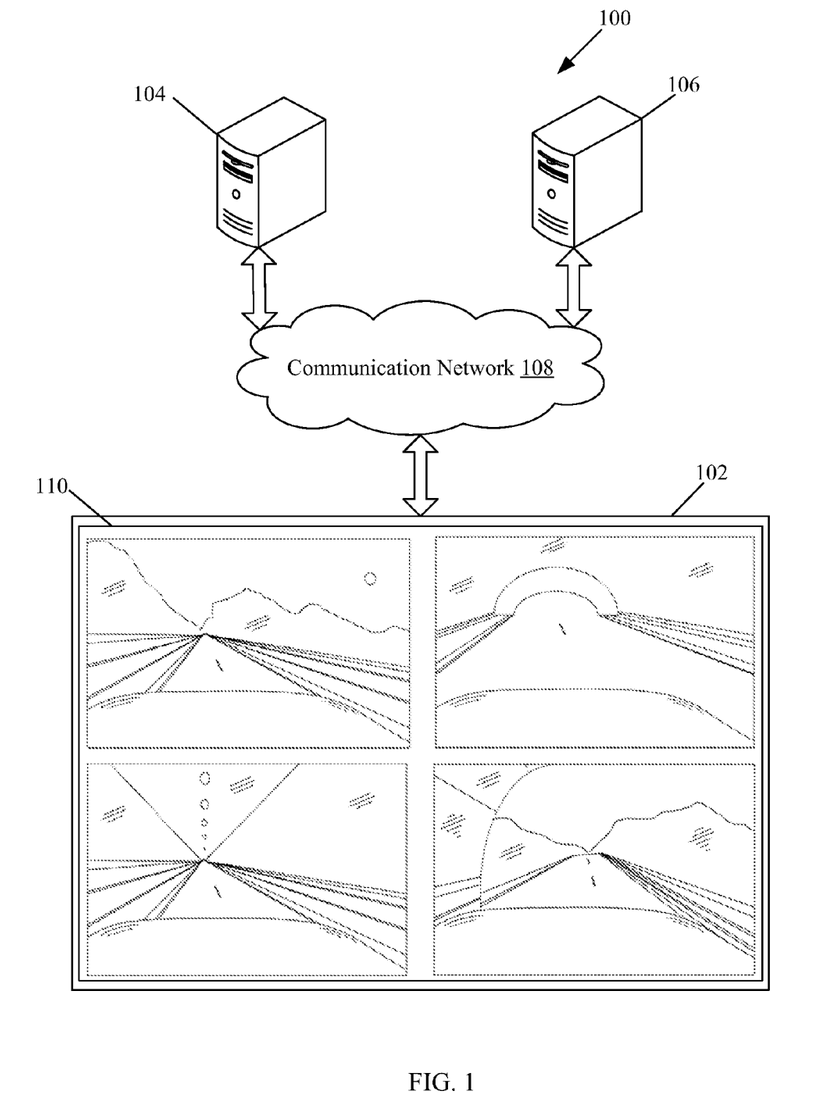
FIG. 1 is a block diagram illustrating a network environment to implement the disclosed method and system to process video content, in accordance with an embodiment of the disclosure.

FIG. 1 is a block diagram illustrating a network environment 100 for displaying video content, in accordance with an embodiment of the disclosure. With reference to FIG. 1, there is shown an electronic device 102, an application server 104, a video content server 106, and a communication network 108. The electronic device 102 may include a display screen 110. The electronic device 102 may be associated with one or more users, such as a user 112 (not shown). The electronic device 102 may be communicatively coupled with the application server 104, and video content server 106, via the communication network 108.

The electronic device 102 may comprise suitable logic, circuitry, interfaces, and/or code that may be operable to receive user input, via a display screen 110. The electronic device 102 may be operable to display a video content for video processing on the display screen 110. The electronic device 102 may be operable to download an application to process the video content from the application server 104, via communication network 108. The electronic device 102 may be operable to retrieve the video content to be processed from the video content server 106, via communication network 108. The electronic device 102 may be further operable to receive one or more user preferences and/or one or more user inputs. The one or more user preferences and/or one or more user inputs may be provided by one or more users, such as the user 112. The electronic device may be further operable to generate a video digest based on a color information, gradient information, and/or motion information, with each frame of the downloaded video content. The electronic device 102 may be further operable to display the generated video digest on the display screen 110. Examples of the electronic device 102 may include, but are not limited to, a television, an Internet Protocol Television (IPTV), a laptop, a tablet computer, a smartphone, and/or a Personal Digital Assistant (PDA) devices.

The application server 104 may comprise suitable logic, circuitry, interfaces, and/or code that may be operable to host the application to process the video content. The application server 104 may be operable to host application for the one or more subscribed devices, such as the electronic device 102. The application server 104 may be implemented using several technologies that are well known to those skilled in the art.

The video content server 106 may comprise suitable logic, circuitry, interfaces, and/or code that may be operable to host the video content. The video content server 106 may be communicatively coupled with a remote video-capturing (not shown) configured to record and store the video content at the video content server 106. The video content server 106 may be implemented using several technologies that are well known to those skilled in the art.

The communication network 108 may include a medium through which the electronic device 102 may communicate with one or more servers, such as the application server 104, and/or the video content server 106. Examples of the communication network 108 may include, but are not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN). Various devices in the network environment 100 may be operable to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), Zigbee, EDGE, infrared (IR), IEEE 802.11, 802.16, cellular communication protocols, and/or Bluetooth (BT) communication protocols.

The display screen 110 may comprise suitable logic, circuitry, interfaces, and/or code that may be operable to render the video content received from one or more video content sources, such as the video content server 106. The display screen 110 may be further operable to render one or more features that correspond to applications downloaded from the application server 104. The display screen 110 may be further operable to receive one or more user preferences from one or more users, such as the user 112. The display screen 110 may be realized through several known technologies that may include, but are not limited to, Liquid Crystal Display (LCD) display, Light Emitting Diode (LED) display, Organic LED (OLED) display technology, and/or the like.

In operation, the electronic device 102 may be operable to download an application to process the video content from the application server 104, via the communication network 108. In an embodiment, the electronic device 102 may be further operable to retrieve the video content to be processed from the video content server 106, via the communication network 108. In an embodiment, the video content may be recorded by a remote video-capturing device. The recorded video content may be stored in the video content server 106. In another embodiment, the video content may be streamed to the electronic device 102 in real time. In an embodiment, the application to process video content may be pre-stored in the electronic device 102. In another embodiment, the application to process video content may be present at the video content server 106.

In an embodiment, the display screen 110 may be operable to render one or more features that correspond to the application downloaded from the application server 104, to the user 112. In an embodiment, the display screen 110 may be further operable to receive one or more user preferences from the user 112. In an embodiment, the user preference may comprise a desired timestamp of a video frame associated with the video content, desired duration of the one or more video segments, and/or a desired duration of the video digest. The user preference may further comprise a color information, a gradient information, a frame background, one or more objects, and/or one or more characteristics associated with the one or more objects in the one or more frames associated with the video content.

In an embodiment, the electronic device 102 may be operable to detect the color information associated with each frame of the video content. In an embodiment, the color information associated with each frame may correspond to a basic color model. The RGB color model may include red (R), green (G), and blue (B) color components, referred to collectively as "RGB color model". In an embodiment, color information associated with each frame may correspond to a derived color model. The color model may comprise a luminance (Y) component, and two chrominance (UV) components, referred to collectively as a "YUV color model". The electronic device 102 may be configured to determine an average color value of each frame of the video content.

In an embodiment, the electronic device 102 may be operable to detect gradient information associated with each frame of the video content. The gradient information of each frame of the video content may correspond to a directional change in intensity and/or color of one or more objects in the frame. The electronic device 102 may be configured to determine an average gradient value of each frame of the video content.

In an embodiment, the electronic device 102 may be operable to determine a first frame identification value based on the average color value and/or the average gradient value of each frame of the video content. In an embodiment, the electronic device 102 may be operable to detect the global motion vector (GMV) value associated with the video content. In an embodiment, the electronic device 102 may be operable to generate a second frame identification value based on a plurality of quantization values, for each frame of the video content.

In an embodiment, the electronic device 102 may be operable to determine a first intermediate frame based on one or both of the first frame identification value and the second frame identification value. In an embodiment, the electronic device 102 may be operable to determine the second intermediate frame, based on one or both of another first frame identification value and another second frame identification value. In such an embodiment, another first frame identification value and another second frame identification value may be determined for a different frame. In an embodiment, the first intermediate frame and/or the second intermediate frame may indicate a scene change in the video content.

In an embodiment, the electronic device 102 may be operable to determine one or more frames between the first intermediate frame and the second intermediate frame. In an embodiment, the electronic device 102 may be further operable to generate a video segment based on the determined one or more frames and/or the first intermediate frame. Notwithstanding, the disclosure may not be so limited, the electronic device 102 may be operable to generate a plurality of the video segments based on a plurality of intermediate frames, without limiting the scope of the disclosure.

In an embodiment, the electronic device 102 may be operable to determine one or more parameters associated with each frame of the video content. In an embodiment, the parameter may comprise a motion behavior analysis value, and/or a stability rank. In an embodiment, the electronic device 102 may be further operable to select one or more key frames from the generated plurality of video segments. In an embodiment, the key frames correspond to one or more video highlights. In an embodiment, the selection of the one or more video highlights may be based on the parameter associated with each frame of the video content, and/or the user preference provided by the user. In an embodiment, the electronic device may be further operable to discard the frames from one or more video highlights. In an embodiment, the discarding of one or more frames may be based on a similarity index. In an embodiment, the similarity index corresponds to a replication of one or more components of the one or more frames. In an embodiment, the electronic device 102 may be further operable to combine the one or more video highlights to generate the video digest.

In an embodiment, the video digest may be customized based on the user inputs. In an embodiment, the user inputs comprise an audio file for background music and/or one or more visual effects desired by the user. In an embodiment, the customized video digest may be rendered on the display screen 110. In an embodiment, the electronic device 102 may be further operable to provide one or more options associated with the video digest to the user. In an embodiment, the options comprise transferring, sharing, saving, editing, and/or playing the video digest.

Figure 2:
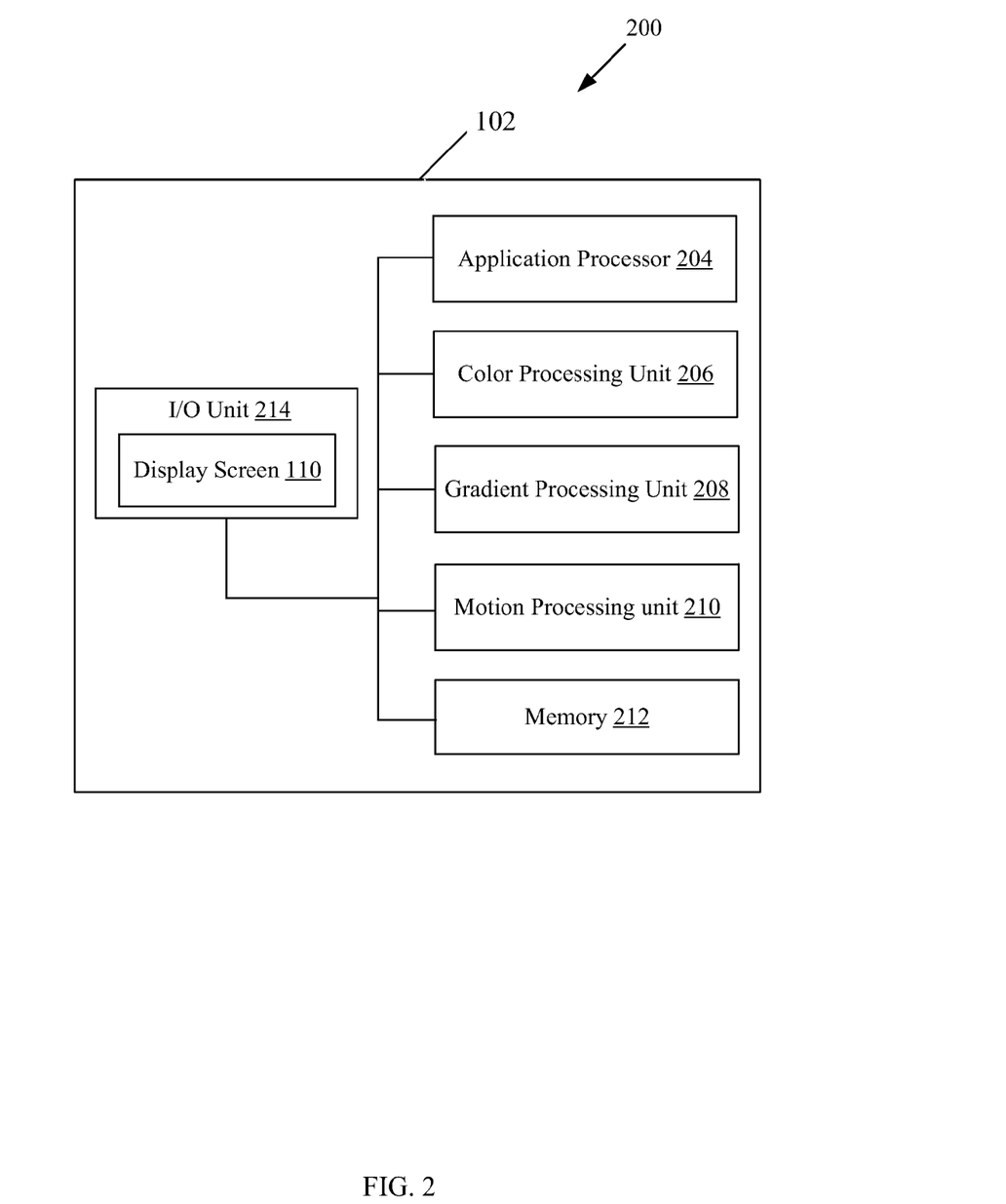
FIG. 2 is a block diagram that illustrates an exemplary electronic device, in accordance with an embodiment of the disclosure.

FIG. 2 is a block diagram 200 that illustrates an exemplary electronic device, in accordance with an embodiment of the disclosure. FIG. 2 is explained in conjunction with elements from FIG. 1. With reference to FIG. 2, there is shown an electronic device 102. The electronic device 102 may comprise one or more processors, such as an application processor 204, a color processing unit 206, a gradient processing unit 208, and a motion processing unit 210. The electronic device 102 may further comprise a memory 212, and one or more input/output (I/O) devices, such as an I/O unit 214. The I/O unit 214 may comprise the display screen 110. The application processor 204 may be communicatively coupled to the color processing unit 206, the gradient processing unit 208, the motion processing unit 210, the memory 212, and the I/O unit 214. In an embodiment, the electronic device 102 may further include a transceiver (not shown). The transceiver may be operable to communicate with the one or more servers, such as the application server 104, the video content server 106, and/or other electronic devices (not shown), via the communication network 108 (FIG. 1). In such an embodiment, the transceiver may be communicatively coupled to one or more processors comprising, the application processor 204, the color processing unit 206, the gradient processing unit 208, the motion processing unit 210, the memory 212, and the I/O unit 214.

The application processor 204 may comprise suitable logic, circuitry, interfaces, and/or code that may be operable to execute a set of instructions stored in the memory 212. The application processor 204 may be operable to determine a first frame identification value and a second frame identification value, associated with video content. The application processor 204 may be further operable to generate video segments. The application processor 204 may combine the video highlights of video segments to generate a video digest. The application processor 204 may be implemented based on a number of processor technologies known in the art.

The color processing unit 206 may comprise suitable logic, circuitry, interfaces, and/or code that may be operable to detect and/or process color information associated with each frame of video content. In an embodiment, the color processing unit 206 may be communicatively coupled to a remote video-capturing device (not shown). The color processing unit 206 may be operable to determine an average color value that corresponds to each frame of the video content, based on one or more algorithms retrieved from the memory 212. The one or more algorithms may correspond to, but are not limited to, an image processing algorithm, a computer vision algorithm, and/or a machine vision algorithm.

The gradient processing unit 208 may comprise suitable logic, circuitry, interfaces, and/or code that may be operable to detect and/or process gradient information associated with each frame of the video content. In an embodiment, the gradient processing unit 208 may be communicatively coupled to the remote video-capturing device. The gradient processing unit 208 may be operable to determine an average gradient value that corresponds to each frame of the video content based on the one or more algorithms retrieved from the memory 212.

The motion processing unit 210 may comprise suitable logic, circuitry, interfaces, and/or code that may be operable to detect and/or process a global motion vector (GMV) value associated with each frame of the video content. The motion processing unit 210 may be communicatively coupled to the remote video-capturing device. The motion processing unit 210 may be operable to determine a GMV value that corresponds to each frame of the video content with respect to an adjacent frame. The motion processing unit 210 may be further operable to determine a stability rank based on a plurality of motion values associated with the electronic device 102.

The application processor 204, the color processing unit 206, the gradient processing unit 208, and the motion processing unit 210 may be implemented as one or more processors. The examples of the application processor 204, the color processing unit 206, the gradient processing unit 208, and the motion processing unit 210 may comprise an X86-based processor, a Reduced Instruction Set Computing (RISC) processor, an Application-Specific Integrated Circuit (ASIC) processor, a Complex Instruction Set Computing (CISC) processor, and/or other processors.

The memory 212 may comprise suitable logic, circuitry, and/or interfaces that may be operable to store a machine code and/or a computer program having at least one code section executable by the application processor 204. The memory 212 may further be operable to store a first frame identification value and/or a second frame identification value that corresponds to each frame of the video content. The memory 212 may be further operable to store one or more quantization values associated with one or more of, color information, gradient information and/or a global motion vector value. The memory 212 may be further operable to store one or more parameters and/or one or more user preferences associated with the electronic device 102 and the video content, respectively. The memory 212 may be further operable to store one or more algorithms, such as a computer vision algorithm and/or a machine vision algorithm, and/or the like. Examples of implementation of the memory 212 may include, but are not limited to, Random Access Memory (RAM), Read Only Memory (ROM), Hard Disk Drive (HDD), and/or a Secure Digital (SD) card.

The I/O unit 214 may comprise suitable logic, circuitry, interfaces, and/or code that may be operable to receive an input from the user, or provide an output to the user. The I/O unit 214 may comprise various input and output devices that may be operable to communicate with the application processor 204. The I/O unit may comprise a display screen 110. Examples of the I/O unit 214 may include, but are not limited to, a keyboard, a mouse, a joystick, a touch screen, a touch pad, a microphone, a camera, a motion sensor, a light sensor, and/or a docking station. Examples of the display screen 110 may include, but are not limited to, Liquid Crystal Display (LCD) display, Light Emitting Diode (LED) display, Organic LED (OLED) display technology, and/or the like.

In operation, the color processing unit 206 may be operable to detect the color information associated with each frame of the video content. In an embodiment, the video content may be captured in real time. In another embodiment, the video content may be a pre-recorded motion video at a post-processing stage. In an embodiment, the color information associated with each frame may correspond to a basic color model, such as an RGB color model. In an embodiment, the color information associated with each frame may correspond to a YUVG color model, and may comprise a luminance (Y) component, and two chrominance (UV) components.

In an embodiment, the color processing unit 206 may be configured to divide each frame into one or more quantization bins, based on a first quantization value "$Q_1$". Notwithstanding, the disclosure may not be so limited, another processor, such as the application processor 204 and/or gradient processing unit 208, may be operable to determine the first quantization value "$Q_1$", without limiting the scope of the disclosure. In an embodiment, the number of such one or more quantization bins may be determined based on a user preference. In an embodiment, the number of quantization bins may be determined based on a pre-stored value retrieved from the memory 212.

In an embodiment, the color processing unit 206 may be configured to compute a quantization divider value, such as "div", based on the first quantization value "$Q_1$", in accordance with equation (1).

$$\text{div}=256/Q_1 \quad (1)$$

In an embodiment, the color processing unit 206 may be operable to communicate the first quantization value "$Q_1$" to the application processor 204. In another embodiment, the color processing unit 206 may be operable to store the first quantization value "$Q_1$" in the memory 212.

In an embodiment, the color processing unit 206 may be configured to determine average color values that correspond to each component associated with a color model. For example, in case of the derived color model, such as the YUV color model, the average color values may correspond to an average of luminance (Y), such as "avg Y", an average of a first chrominance component (U), such as "avg U", and an average of a second chrominance component (V), such as "avg V", of each frame. In an embodiment, the color processing unit 206 may be configured to determine a plurality of first quantization values, such as a Y color quantization value "y", a U color quantization value "u", and a V color quantization value "v", in accordance with the equations (2), (3), and (4).

$$y=(\text{avg } Y)/\text{div} \quad (2)$$

$$u=(\text{avg } U)/\text{div} \quad (3)$$

$$v=(\text{avg } V)/\text{div} \quad (4)$$

where, "avg Y", "avg U", and "avg V" are the average Y, U, and V values, respectively, that correspond to each frame of the video content.

The plurality of first quantization values may indicate a plurality of bin numbers that corresponds to the average color value. In an embodiment, the color processing unit 206 may be further operable to communicate the determined plurality of first quantization values to the application processor 204. In an embodiment, the color processing unit 206 may store the determined plurality of first quantization values in the memory 212.

In an embodiment, the gradient processing unit 208 may be operable to detect gradient information associated with each frame of the video content. The gradient information of each frame of the video content may correspond to a directional change in intensity and/or color of one or more objects in the frame. The gradient processing unit 208 may be configured to determine an average gradient value, such as "G", that may correspond to each frame of the video content. In an embodiment, the gradient processing unit 208 may be configured to determine a gradient quantization value, such as "g", based on the quantization divider value, such as "div", in accordance with equation (5).

$$g=(\text{avg } G)/\text{div} \quad (5)$$

In an embodiment, the gradient processing unit 208 may be further operable to communicate the determined gradient quantization value "g" to the application processor 204. In an embodiment, the color processing unit 206 may store the determined gradient quantization value "g" in the memory 212.

In an embodiment, the application processor 204 may be operable to generate a first frame identification value, such as "YUVG frame ID", based on the determined plurality of first quantization values and the gradient quantization value. The first frame identification value "YUVG frame ID", may be determined in accordance with equation (6).

$$\text{YUVG frame ID} = (y*Q_1*Q_1*Q_1) + (u*Q_1*Q_1) + (v*Q_1) + g \quad (6)$$

In an embodiment, the motion processing unit 210 may be operable to detect the GMV value associated with the video content. In an embodiment, the motion processing unit 210 may be configured to divide a frame into one or more quantization bins based on a second quantization value "$Q_2$". In an embodiment, the motion processing unit 210 may be operable to communicate the second quantization value "$Q_2$" to the application processor 204. In an embodiment, the motion processing unit 210 may be operable to store the second quantization value "$Q_2$" in the memory 212.

In an embodiment, the motion processing unit 210 may be operable to determine an x-axis translation quantization value "$Q_x$", a y-axis translation quantization value "$Q_y$", and a rotation quantization value "$Q_r$" of the electronic device 102. In an embodiment, the motion processing unit 210 may be further operable to determine a plurality of motion values of the electronic device 102. The plurality of motion values may include, a first motion value "$t_x$", a second motion value "$t_y$", and a third motion value "rot".

The first motion value "$t_x$" may correspond to a transition of the electronic device 102 along the x-axis. The second motion value, such as "$t_y$", may correspond to a transition of the electronic device 102 along the y-axis. The third motion value "rot", may correspond to a rotational component of the electronic device 102. In an embodiment, the motion processing unit 210 may be further operable to determine a plurality of second quantization values, such as a x-axis motion quantization value "x", a y-axis motion quantization value "y", and a rotational motion quantization value "r", based on the plurality of motion values, in accordance with equations (7), (8), and (9).

$$x = \min(Q_2 - 1, \text{abs}(t_x/Q_x)) \quad (7)$$

$$y = \min(Q_2 - 1, \text{abs}(t_y/Q_y)) \quad (8)$$

$$r = \min(Q_2 - 1, \text{abs}(\text{rot}/Q_r)) \quad (9)$$

In an embodiment, the color processing unit 206 may be further operable to communicate the plurality of second quantization values determined in equations (7), (8), and (9), to the application processor 204. In an embodiment, the motion processing unit 210 may store the determined plurality of second quantization values in the memory 212. In an embodiment, the application processor 204 may be operable to generate a second frame identification value, such as "GMV frame ID", based on the determined plurality of second quantization values, and an encoded sign pattern "EncodedSignPattern". In an embodiment, the second frame identification value "GMV frame ID", may be determined in accordance with equation (10).

$$\text{GMV frame ID} = (x*Q_2*Q_2) + (y*Q_2) + r + \text{EncodedSignPattern} \quad (10)$$

In an embodiment, the application processor 204 may be operable to store the first frame identification value and the second frame identification value, in the memory 212. In an embodiment, the application processor 204 may be operable to determine the first intermediate frame based on one or both of the first frame identification value and the second frame identification value. In an embodiment, the application processor 204 may be operable to determine the second intermediate frame, based on one or both of another first frame identification value and another second frame identification value. In such an embodiment, another first frame identification value and another second frame identification value may be determined in a way similar to the determination of the first frame identification value and the second frame identification value, for a different frame.

In an embodiment, the first intermediate frame and/or the second intermediate frame may indicate a scene change in the video content. Such a scene change indicated by the first intermediate frame and/or the second intermediate frame may be utilized in a variety of applications. Examples of such applications may include, but are not limited to, an intelligent video digest extraction, video indexing for quick browsing, real-time key frame extraction for video encoding, and/or change detection in surveillance videos.

In an embodiment, the application processor 204 may be operable to determine one or more frames between the first intermediate frame and the second intermediate frame. Based on the determined one or more frames and/or the first intermediate frame, the application processor 204 may be operable to generate a video segment. Notwithstanding, the disclosure may not be so limited, the application processor 204 may be operable to generate a plurality of the video segments based on a plurality of intermediate frames, without limiting the scope of the disclosure.

In an embodiment, the application processor 204 may be operable to determine a stability rank that may correspond to a variance in GMV characteristics of the electronic device 102. In an embodiment, the stability rank may be inversely proportional to the variance in the GMV characteristics of the electronic device 102. In an embodiment, the application processor 204 may determine the stability rank for each frame of the video content, based on the one or more algorithms retrieved from the memory 212. In an embodiment, the application processor 204 may determine the stability rank for each frame of the video content, based on the determined plurality of motion values. For example, the stability rank for frames of a video content associated with a surveillance camera may be high as the frames exhibit a negligible transitional and/or rotational motion of one or more objects in the frames. In an exemplary scenario, the video content may comprise abrupt activities, such as a road accident, thunder, and/or a heavy traffic situation. In such a scenario, value of the stability rank for the frames of the video content may be less than a pre-defined threshold value as the frames exhibit a substantial transitional and/or rotational motion of the one or more objects in the frames. In an embodiment, the application processor 204 may be operable to select the frames with the value of stability rank greater than the pre-defined threshold value, so that the transitions in the generated video digest are smooth. In an embodiment, the application processor 204 may be operable to automatically select the frames with the value of the stability rank less than the pre-defined threshold value. In such a case, the automatically selected frames may comprise the abrupt activities.

In an embodiment, the application processor 204 may be operable to retrieve one or more parameters and/or one or more user preferences from the memory 212. In an embodiment, the one or more parameters may comprise motion behavior analysis value of the electronic device 102, and/or stability rank of the one or more frames. The motion behavior analysis value may correspond to a direction, magnitude, and velocity of displacement of the electronic device 102 with respect to a reference point. In an embodiment, the stability rank may be determined from the video content in the one or more frames based on implementation of the one or more algorithms retrieved from the memory 212. In an embodiment, the stability rank may be automatically determined based on the determined plurality of motion values of the electronic device 102. In an embodiment, the user preference, provided by the user, may comprise a desired timestamp, desired duration of the one or more video segments, and/or a desired duration of the video digest. The user preference may further include color information, gradient information, frame background, one or more objects, and/or one or more characteristics associated with the one or more objects in the one or more frames.

In an embodiment, the application processor 204 may select one or more key frames from the generated video segments. In an embodiment, the selected key frames correspond to video highlights. In an embodiment, the video highlights may be selected based on one or more parameters and/or one or more user preferences. In an embodiment, to refine the one or more video highlights, the application processor 204 may discard one or more frames from the generated one or more video highlights. In an embodiment, the application processor 204 may discard one or more frames based on a similarity index. In an embodiment, the similarity index may be associated with a degree of replication between one or more components of the one or more frames. The one or more components may comprise color information, gradient information, frame background, one or more objects, and/or one or more characteristics associated with the one or more objects in the one or more frames. In an embodiment, the application processor 204 may be operable to combine the refined one or more video highlights to generate the video digest.

In an embodiment, the I/O unit 214 may be operable to receive user input to customize the generated video digest. The user input may include an audio file for background music and/or one or more visual effects desired by the user. In an embodiment, the application processor 204 may be operable to customize the generated video digest based on the received user input. The customized video digest may be displayed on the display screen 110. In an embodiment, the I/O unit 214 may be operable to provide one or more options to the user. The one or more options may correspond to transferring, sharing, saving, editing, and/or playing the video digest.

FIGS. 3A, 3B, 3C, 3D, and 3E illustrate an exemplary scenario to implement the disclosed method and system to process video content, in accordance with an embodiment of the disclosure. FIGS. 3A, 3B, 3C, 3D, and 3E are explained in conjunction with elements from FIG. 1 and FIG. 2. With reference to FIGS. 3A, 3B, 3C, 3D, and 3E, there are shown exemplary frames 300a, 300b, 300c, 300d, and 300e, associated with a video content. The exemplary frames 300a, 300b, 300c, 300d, and 300e, may comprise a vehicle 302 moving on a terrain. The terrain may include a road 304, a landscape 306, and/or a tunnel 308. Each of the exemplary frames 300a, 300b, 300c, 300d, and 300e, may have associated information that corresponds to a frame identification value (not shown), the first frame identification value "YUVG frame ID", and/or the second frame identification value "GMV frame ID".

Figure 3A:
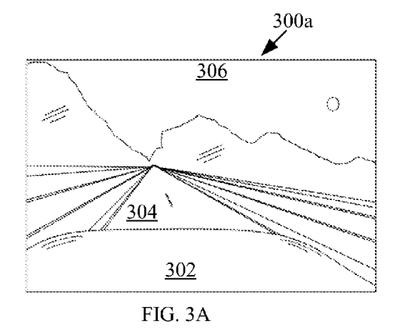
FIGS. 3A, 3B, 3C, 3D and 3E illustrate an exemplary scenario to implement the disclosed method and system to process video content, in accordance with an embodiment of the disclosure.

With reference to FIG. 3A, in the exemplary scenario, the frame 300a may comprise the vehicle 302. The vehicle 302 may be approaching the tunnel 308 such that the landscape 306 encompasses a major portion of the frame 300a. The frame 300a may correspond to a frame ID with a value "6".

In an embodiment, the color processing unit 206 may divide the frame 300a into quantization bins based on the first quantization value "$Q_1$". In an embodiment, the first quantization value "$Q_1$" may be based on a user preference or a pre-stored value. In an embodiment, the color processing unit 206 may determine the quantization divider value "div" in accordance with the equation (1). In an embodiment, the color processing unit 206 may determine the plurality of first quantization values "y", "u", and "v", associated with frame 300a, in accordance with the equations (2), (3), and (4). In an embodiment, the gradient processing unit 208 may determine the gradient quantization value "g" associated with the frame 300a, in accordance with the equation (5). The application processor 204 may use the generated plurality of first quantization values "y", "u", and "v", and the gradient value "g" to generate the first frame identification value "YUVG frame ID". The first frame identification value "YUVG frame ID", such as "1752", may be generated in accordance with the equation (6).

Figure 3B:
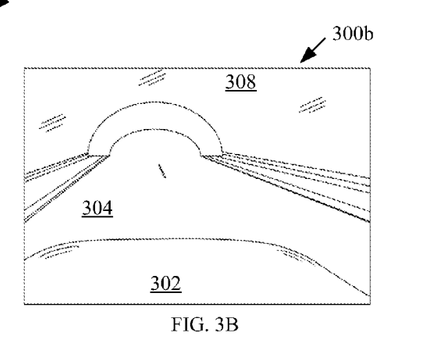

In an embodiment, the motion processing unit 210 may determine the second frame identification value "GMV frame ID" associated with a pair of frames, such as the frames 300a and 300b. In an embodiment, the motion processing unit 210 may divide the frame 300a into quantization bins based on the second quantization value "$Q_2$". In an embodiment, the motion processing unit 210 may be operable to determine an x-axis translation quantization value "$Q_x$", a y-axis translation quantization value "$Q_y$", and a rotation quantization value "$Q_r$". In an embodiment, the motion processing unit 210 may further determine the plurality of motion values, such as the first motion value "$t_x$", the second motion value "$t_y$", and the third motion value "rot", associated with the pair of frames. In an embodiment, the gradient processing unit 208 may determine the plurality of second quantization values, associated with the frame 300a, in accordance with the equations (7), (8), and (9). The application processor 204 may generate the second frame identification value "GMV frame ID", such as "7", in accordance with the equation (10). In an embodiment, a portion of the display screen 110 (not shown) may display "frame ID: 6; YUVG frame ID: 1752; GMV frame ID: 7".

With reference to FIG. 3B, the vehicle 302 may approach the tunnel 308, as shown in the frame 300b. The application processor 204 may generate "YUVG frame ID" and a "GMV frame ID", which corresponds to the approach point in the tunnel. This process is similar to the process described in FIG. 3A. With reference to the exemplary scenario, the frame 300b may correspond to the frame ID with a value "352". The application processor 204 may generate the first frame identification value "YUVG frame ID", such as "2264", in accordance with the equation (6). The change in the first frame identification value "YUVG frame ID" may be caused by the change in the average Y, U, V and G values. The change in the average Y, U, V and G values between frames 300a and 300b may occur as a consequence of a change in the surroundings. The application processor 204 may further generate the second frame identification value "GMV frame ID", such as "7", in accordance with the equation (10). In an embodiment, the portion of the display screen 110 may display "frame ID: 352; YUVG frame ID: 2264; GMV frame ID: 7".

Figure 3C:
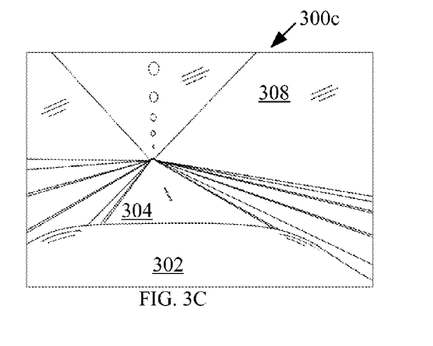

With reference to FIG. 3C, the vehicle 302 may enter the tunnel 308, as shown in the frame 300c. The application processor 204 may generate "YUVG frame ID" and a "GMV frame ID", in a similar manner described in FIG. 3A. With reference to the exemplary scenario, the frame 300c may correspond to the frame ID with a value "360". The application processor 204 may generate the first frame identification value "YUVG frame ID", such as "3752", in accordance with the equation (6). The change in the first frame ID value "YUVG frame ID" may be caused by the change in the average Y, U, V, and G values. The change in the average Y, U, V and G values between frame 300b and 300c may occur as a consequence of a change in the surroundings. The application processor 204 may further generate the second frame ID value "GMV frame ID", such as "20", in accordance with the equation (10). In an embodiment, the display screen 110 may display "frame ID: 360; YUVG frame ID: 3752; GMV frame ID: 20".

Figure 3D:
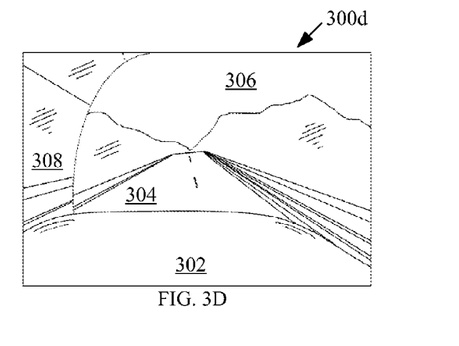

With reference to FIG. 3D, the vehicle 302 may be at the exit point of the tunnel 308, as shown in the frame 300d. The application processor 204 may generate "YUVG frame ID" and a "GMV frame ID", in a similar manner, as described in FIG. 3A. With reference to the exemplary scenario, the frame 300d may correspond to the frame ID with a value "450". The application processor 204 may generate the first frame identification value "YUVG frame ID", such as "2752", in accordance with the equation (6). The change in the first frame ID value "YUVG frame ID" may be caused by the change in the average Y, U, V, and G values. The change in the average Y, U, V and G values between frame 300b and 300c may occur as a consequence of a change in the surroundings. The application processor 204 may further generate the second frame ID value "GMV frame ID", such as "7", in accordance with the equation (10). In an embodiment, the display screen 110 may display "frame ID: 450; YUVG frame ID: 2752; GMV frame ID: 7".

Figure 3E:
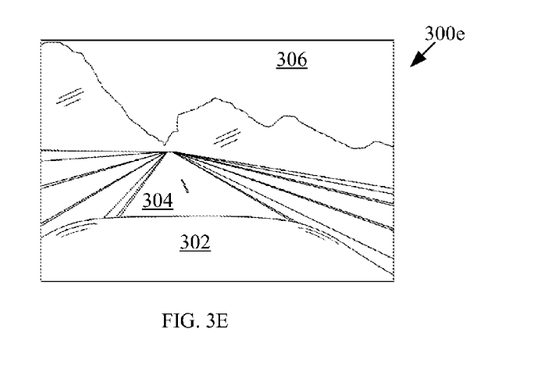

With reference to FIG. 3E, the vehicle 302 may exit the tunnel 308 to return to the landscape 306, as shown in the frame 300e. With reference to the exemplary scenario, the frame 300e may correspond to the frame ID with a value "472". The application processor 204 may generate the first frame ID value "YUVG frame ID", such as "1752", in accordance with the equation (6). The change in the first frame identification value "YUVG frame ID" may be caused by the change in the average luminance Y, U, V, and G values. The change in the average Y, U, V and G values between frame 300b and 300c may occur as a consequence of a change in the surroundings. The application processor 204 may further generate the second frame ID value "GMV frame ID", such as "7", in accordance with the equation (10). The similarity in the "YUVG frame ID" and the "GMV frame ID" associated with frame 300a and 300e may be attributed to the similarity in the exposure to light and color gradients associated with the color spaces of both the frames. In an embodiment, the display screen 110 may display "frame ID: 472; YUVG frame ID: 1752; GMV frame ID: 7".

In an embodiment, the application processor 204 may also determine the stability rank for each frame (e.g. 300a, 300b, 300c, 300d, and 300e) of the video content. The stability rank may be based on the plurality of second quantization values, such as "$t_x$", "$t_y$", and/or "rot", associated with each of the shown frames 300a to 300e. In an embodiment, the stability rank may change from one frame to another frame, based on the degree of variance of plurality of motion values associated with the electronic device 102.

Figure 4:
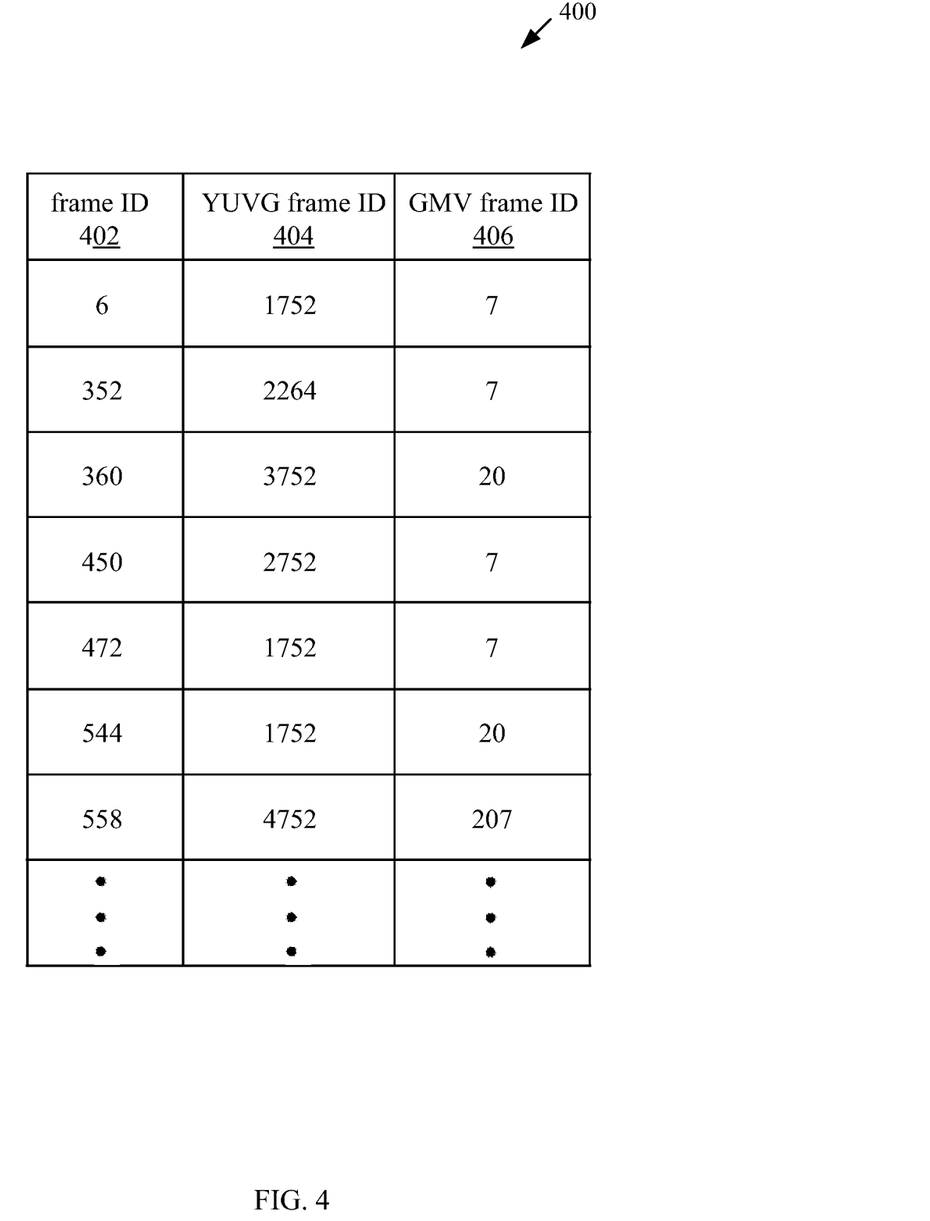
FIG. 4 is a table that illustrates an exemplary scenario to process video content, in accordance with an embodiment of the disclosure.

With reference to FIG. 4, the application processor 204 may determine a first intermediate frame based on the change detected in the "YUVG frame ID" and/or the "GMV frame ID". The application processor 204 may determine the first intermediate frame that corresponds to the frame ID "6". The application processor 204 may further determine a second intermediate frame based on the change detected in the "YUVG frame ID" and/or the "GMV frame ID". The application processor 204 may determine the second intermediate frame that corresponds to the frame ID "352". The application processor 204 may generate a first video segment, such as "segment #1", based on "345 number of frames" between the first intermediate frame and the second intermediate frame. The first video segment "segment #1" may further comprise the first frame ID "6". The application processor 204 may further determine subsequent intermediate frames in a similar way, as explained previously. Based on the determination of subsequent intermediate frames, subsequent video segments, such as "segment#2" and "segment#3", are generated. In an embodiment, the application processor 204 may discard some of the frames from "segment #1" based on global motion vector analysis and/or the stability rank. In such an instance, the segment with the remaining frames may comprise video highlights of the video content. In instances where a user preference is available, the application processor 204 may discard one or more frames from the video highlight based on such user preferences.

In an embodiment, application processor 204 may select one or more video highlights, based on the one or more parameters and/or one or more user preferences. For example, the user may select a first video highlight, such as the frame IDs "7" to "20" from video segment "segment#1". The user may further select a second video highlight, such as the frame ID "355" to "359", from video segment "segment#2". The user may further select a third video highlight, such as the frame ID "360" to "365" from video segment "segment#3". In an embodiment, the application processor 204 may discard one or more frames, such as frame IDs "8" and "360", from the first video highlight and the third video highlight, respectively. The application processor 204 may further discard frame IDs "10" and "362", as frame ID "10" may be similar to a previously added frame with frame ID "9", and frame ID "362" may be similar to a previously added frame with frame ID "361". Based on the frame IDs "7", "9", "11" to "20", "355" to "359", and "361", "363" to "365", the application processor 204 may generate a video digest by combining the corresponding frames. The user may provide an input, such as a background score "xyz.wav", to customize the generated video digest. The customized video digest may be displayed on the display screen 110.

Figure 5A:
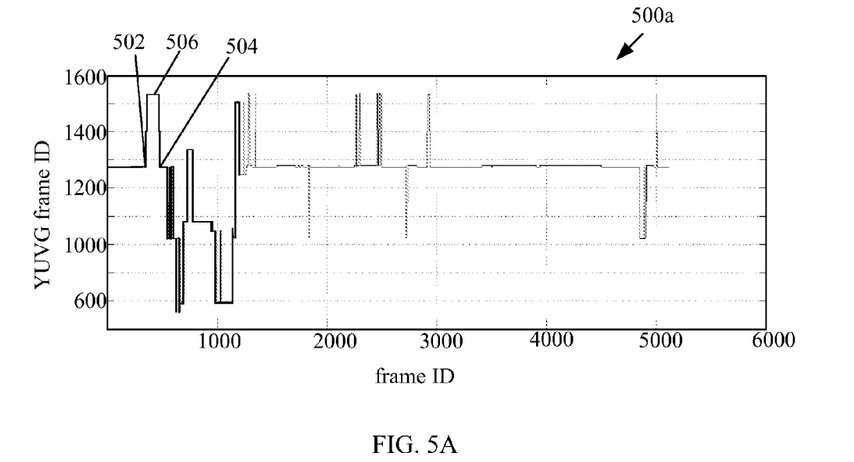
FIGS. 5A, 5B and 5C are graphs that illustrate an exemplary scenario to process video content, in accordance with an embodiment of the disclosure.
Figure 5B:
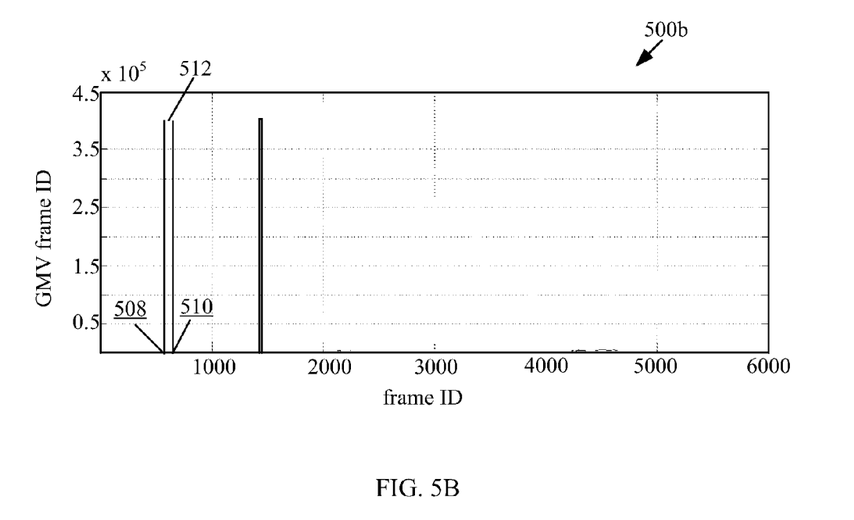
Figure 5C:
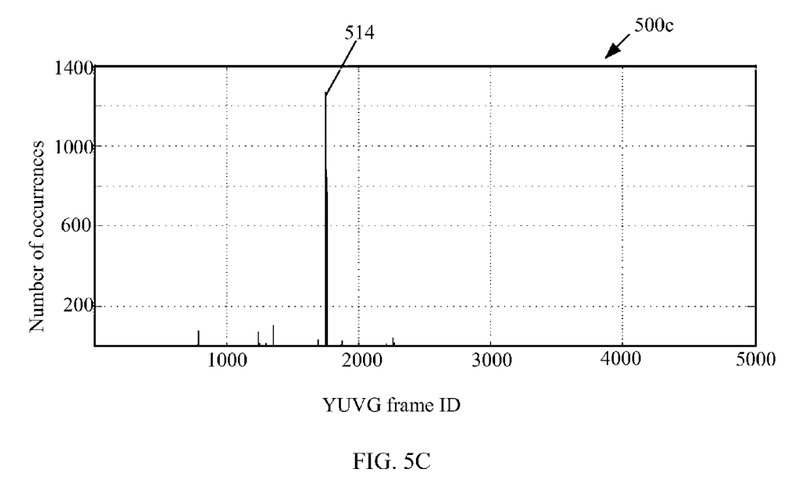

FIGS. 5A, 5B and 5C are graphs 500a, 500b, and 500c that illustrate an exemplary scenario to process video content, in accordance with an embodiment of the disclosure. FIGS. 5A, 5B and 5C have been explained in conjunction with elements from FIG. 4. With reference to FIG. 5A, the graph 500a may be plotted between "YUVG frame ID" and "frame ID". The "YUVG frame ID" may be represented on an x-axis and the "frame ID" may be represented on a y-axis. In such a graphical representation, the frame, at which a change in the value of "YUVG frame ID" may be determined, may correspond to a first intermediate frame 502. A subsequent change in the "YUVG frame ID" may correspond to a second intermediate frame 504. A video segment 506 may be generated based on the first intermediate frame 502 and the second intermediate frame 504. The video segment 506 may include a sequence of frames that starts from the first intermediate frame 502 to a frame immediately before the second intermediate frame 504.

With reference to FIG. 5B, the graph 500b may be plotted between the "GMV frame ID" and the "frame ID". The "GMV frame ID" may be represented on an x-axis and the "frame ID" may be represented on a y-axis. In such a graphical representation, a frame at which the change in the value of "GMV frame ID" may be observed, may correspond to a first intermediate frame 508. A subsequent change in the "GMV frame ID" may correspond to a second intermediate frame 510. A video segment 512 may be generated based on the first intermediate frame 508 and the second intermediate frame 510. The video segment 512 may include a sequence of frames from the first intermediate frame 508 to a frame immediately before the second intermediate frame 510.

With reference to FIG. 5C, the graph 500c may be plotted between "number of occurrences" and "YUVG frame ID". The "YUVG frame ID" which may correspond to the video content, may be represented on an x-axis. The "number of occurrences", which corresponds to the number of occurrences of the "YUVG frame ID", may be represented on a y-axis. The graph 500c may illustrate that for a "YUVG frame ID" with value "1752", the "number of occurrences" may be more than 1200, as shown via a peak value 514.

Figure 6:
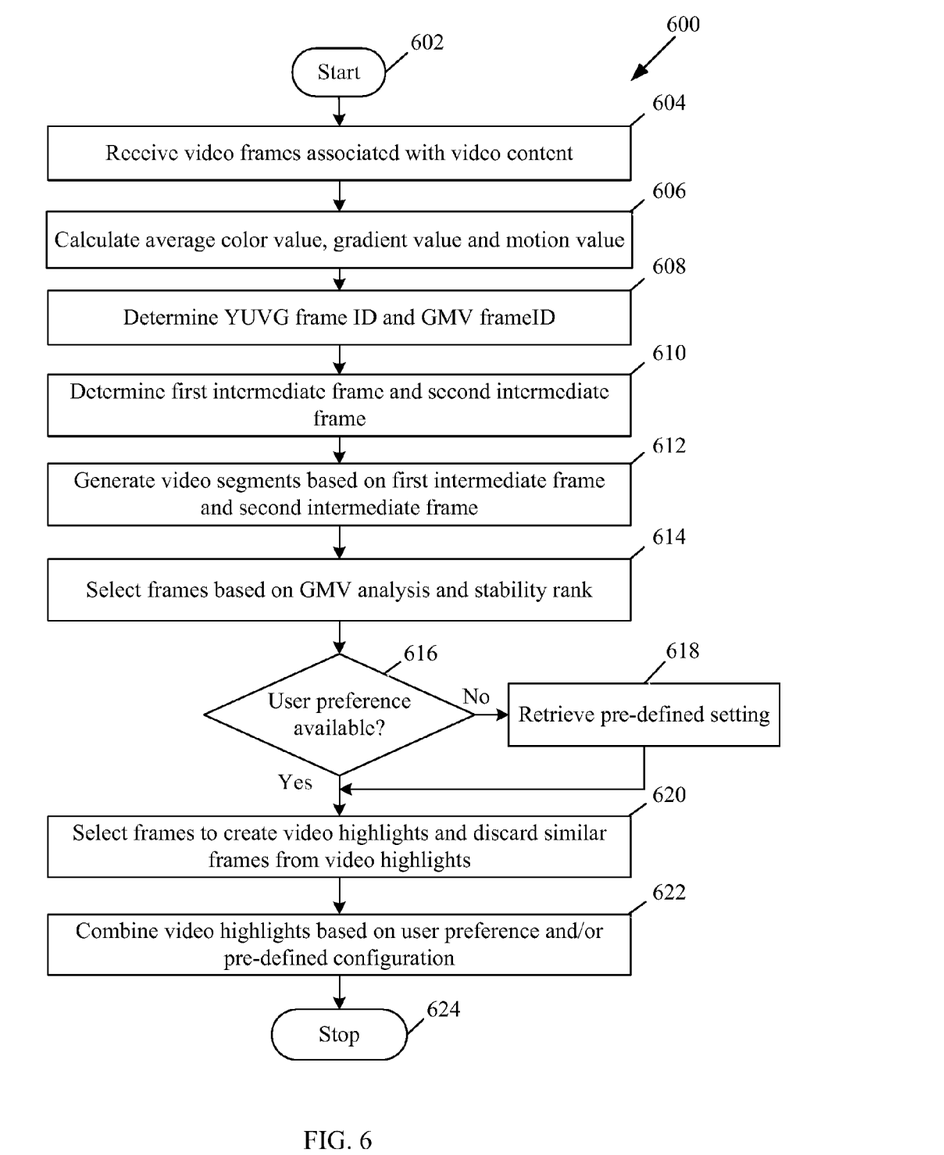
FIG. 6 is a flowchart that illustrates a method to process video content, in accordance with an embodiment of the disclosure.

FIG. 6 is a flow chart that illustrates a method to process video content, in accordance with an embodiment of the disclosure. With reference to FIG. 6, there is shown a flow chart 600. The flow chart 600 is described in conjunction with FIGS. 1, 2, 3A to 3E, 4, and 5A to 5C. The method starts at step 602 and proceeds to step 604.

At step 604, a plurality of frames associated with video content may be retrieved by the electronic device 102. At step 606, the plurality of first quantization values, the average color values, the average gradient value, and the plurality of second quantization values may be determined. At step 608, the "YUVG frame ID" and/or the "GMV frame ID" may be determined.

At step 610, the first intermediate frame and the second intermediate frame may be determined. At step 612, the video segments may be generated based on the first intermediate frame and the second intermediate frame. At step 614, one or more frames may be selected from the generated video segments based on motion behavior analysis value and/or the stability rank.

At step 616, the availability of one or more user preferences may be determined. In instances where the one or more user preferences are not available, the control passes to step 618. At step 618, the pre-defined settings may be retrieved. In instances where the one or more user preferences are available, the control passes to step 620. At step 620, the one or more frames that correspond to a user preference and/or a pre-defined setting are selected from the video segments to generate one or more video highlights. In an embodiment, the frames that are similar may be discarded from the one or more video highlights. At step 622, the one or more video highlights may be combined to generate a video digest. Control passes to end step 624.

In accordance with an embodiment of the disclosure, the system to process video may comprise the electronic device 102 (FIG. 1). The electronic device 102 may comprise one or more processors, such as the application processor 204 (FIG. 1), operable to determine a first frame identification value associated with the video content. The first frame identification value may correspond to an average color value of a frame of the video content. The application processor 204 may further determine a second frame identification value associated with the video content. The second frame identification value may correspond to a GMV value of the frame of the video content. The application processor 204 may further determine a first intermediate frame based on one or both of the first frame identification value and the second frame identification value. The determined first intermediate frame may indicate a scene change in the video content Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer to process video content. The at least one code section in an electronic device may cause the machine and/or computer to perform the steps that comprise dynamically determining a first frame identification value associated with the video content. The first frame identification value may correspond to an average color value of a frame of the video content. A second frame identification value associated with the video content may be determined. The second frame identification value may correspond to a GMV value of the frame of the video content. A first intermediate frame based on one or both of the first frame identification value and the second frame identification value may be further determined. The determined first intermediate frame may indicate a scene change in the video content.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for processing video content, the method comprising:
   in an electronic device:
      determining a first frame identification value associated with said video content, wherein said first frame identification value corresponds to an average color value of a frame of said video content;

determining a second frame identification value associated with said video content, wherein said second frame identification value corresponds to a global motion vector (GMV) value of said frame of said video content; and determining a first intermediate frame based on one or both of: said determined said first frame identification value and said determined said second frame identification value, wherein said determined said first intermediate frame indicates a scene change in said video content.

2. The method according to claim 1, wherein said first frame identification value corresponds to a gradient value associated with said frame of said video content.

3. The method according to claim 1, wherein said average color value corresponds to a color model comprising one of: a luminance and chrominance (YUV) color model and/or a red, green, and blue (RGB) color model.

4. The method according to claim 1, wherein said first frame identification value for said frame is generated based on a first quantization value and wherein said second frame identification value is based on a second quantization value.

5. The method according to claim 1, further comprising determining a second intermediate frame based on one or both of: another first frame identification value and another second frame identification value, wherein said determined said second intermediate frame indicates a scene change in said video content.

6. The method according to claim 5, further comprising determining one or more frames between said determined said first intermediate frame and said determined said second intermediate frame.

7. The method according to claim 6, wherein said determining is based on a change in one or both of: said determined said first frame identification value, and said determined said second frame identification value.

8. The method according to claim 6, further comprising generating a video segment based on said determined said one or more frames, and said determined said first intermediate frame.

9. The method according to claim 8, further comprising selecting one or more key frames from said generated said video segment based on one or more parameters and/or one or more user preferences associated with each of said frames.

10. The method according to claim 9, wherein said parameter comprises one or more of a motion behavior analysis value and/or a stability rank.

11. The method according to claim 9, further comprising combining said selected one or more key frames to generate a video digest based on one or more user inputs and/or a default setting.

12. The method according to claim 11, wherein said one or more user preferences comprises one or more of: a desired duration of said video segment, a desired duration of said video digest, a duration of an audio file provided by said user, a desired stability rank, an object present in a video segment, a characteristic associated with said object, and/or a color value and a gradient value associated with key frames corresponding to said video segment.

13. The method according to claim 12, wherein said desired duration of said video digest is determined based on one or more of: a user input comprising an audio file, and/or a pre-stored value of video digest duration.

14. The method according to claim 1, further comprising determining a stability rank corresponding to said frame, wherein said stability rank corresponds to a variance in a global motion vector (GMV) characteristics of said frame.

15. The method according to claim 14, wherein said determined stability rank is inversely proportional to said variance.

16. A system for processing video content, the system comprising:

one or more processors in an electronic device operable to:

determine a first frame identification value associated with said video content, wherein said first frame identification value corresponds to an average color value of a frame of said video content, wherein said video content comprises one or more frames;

determine a second frame identification value associated with said video content, wherein said second frame identification value corresponds to a global motion vector (GMV) value of said frame of said video content; and determine a first intermediate frame based on one or both of: said determined said first frame identification value and said determined said second frame identification value, wherein said determined said first intermediate frame indicates a scene change in said video content.

17. The system according to claim 16, wherein said one or more processors are operable to generate said first frame identification value for said frame based on a first quantization value, and wherein said second frame identification value is based on a second quantization value.

18. The system according to claim 16, wherein said one or more processors are operable to determine a second intermediate frame based on one or both of: said determined said first frame identification value and said determined said second frame identification value, wherein said determined said second intermediate frame indicates a scene change in said video content.

19. The system according to claim 16, wherein said one or more processors are operable to determine one or more frames between said determined said first intermediate frame and said determined said second intermediate frame wherein, said determining is based on a change in one or both of: said determined said first frame identification value, and said determined said second frame identification value, corresponding to a said determined said first intermediate frame and said determined said second intermediate frame.

20. The system according to claim 19, wherein said one or more processors are operable to generate a video segment based on said determined said one or more frames, and said determined said first intermediate frame.

21. The system according to claim 20, wherein said one or more processors are operable to select one or more key frames from said generated said video segment based on one or more parameters and/or one or more user preferences associated with each of said frames, wherein said parameter comprises one or more of a motion behavior analysis value and/or a stability rank.

22. The system according to claim 21, wherein said one or more processors are operable to combine said selected one or more key frames to generate a video digest based on a user preference and/or a default setting.

23. The system according to claim 16, wherein said one or more processors are operable to determine a stability rank corresponding to said frame, wherein said stability rank corresponds to a variance in a global motion vector (GMV) characteristics of said frame.

24. A non-transitory computer-readable storage medium having stored thereon, a computer program having at least one code section for displaying information, the at least one code section being executable by a computer for causing the computer to perform steps comprising:

> determining a first frame identification value associated with said video content, wherein said first frame identification value corresponds to an average color value of a frame of said video content, wherein said video content comprises one or more frames;
>
> determining a second frame identification value associated with said video content, wherein said second frame identification value corresponds to a global motion vector (GMV) value of said frame of said video content; and
>
> determining a first intermediate frame based on one or both of: said determined said first frame identification value and said determined said second frame identification value, wherein said determined said first intermediate frame indicates a scene change in said video content.

* * * * *